United States Patent
Peters et al.

(10) Patent No.: US 12,249,157 B2
(45) Date of Patent: Mar. 11, 2025

(54) METHOD, SYSTEM AND COMPUTER PROGRAM PRODUCT FOR DETECTING MOVEMENTS OF THE VEHICLE BODY IN THE CASE OF A MOTOR VEHICLE

(71) Applicant: Dr. Ing. h.c. F. Porsche Aktiengesellschaft, Stuttgart (DE)

(72) Inventors: Yannik Peters, Birkenheide (DE); Matthias Stadelmayer, Geislingen an der Steige (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 460 days.

(21) Appl. No.: 17/533,556

(22) Filed: Nov. 23, 2021

(65) Prior Publication Data

US 2022/0165067 A1      May 26, 2022

(30) Foreign Application Priority Data

Nov. 23, 2020   (DE) .......................... 10 2020 130 886

(51) Int. Cl.
*G06V 20/58*      (2022.01)
*B60W 50/14*     (2020.01)
(Continued)

(52) U.S. Cl.
CPC ............. *G06V 20/58* (2022.01); *B60W 50/14* (2013.01); *B60W 60/001* (2020.02); *G06N 3/08* (2013.01);
(Continued)

(58) Field of Classification Search
CPC .... G06V 20/58; G06V 10/82; G06V 2201/08; G06N 3/08; G06N 3/045; G06N 3/088;
(Continued)

(56) References Cited

U.S. PATENT DOCUMENTS 10,106,167 B2   10/2018   Mohamed
10,493,998 B2   12/2019   Park
(Continued)

FOREIGN PATENT DOCUMENTS

CN    101029823 A   *   9/2007   ......... B60G 17/0165
CN    106250838 A   *   12/2016
(Continued)

OTHER PUBLICATIONS

Breuer et al., "Towards Tactical Maneuver Detection for Autonomous Driving Based on Vision Only," 2019 IEEE Intelligent Vehicles Symposium (IV), Paris, France, 2019, pp. 941-948, doi: 10.1109/IVS.2019.8813816. (Year: 2019).*
(Continued)

*Primary Examiner* — Ming Y Hon
*Assistant Examiner* — Julia Z. Yao
(74) *Attorney, Agent, or Firm* — Gerald E. Hespos; Michael J Porco

(57) ABSTRACT

A method for detecting movements of a body of a first motor vehicle includes recording image and sensor data by a camera and sensor device of a second motor vehicle. The image and sensor data represent that part of the environment of the second motor vehicle that contains the first motor vehicle. The image and sensor data are forwarded to a data analysis device that detects movements of the body of the first motor vehicle and uses artificial intelligence algorithms and machine image analysis to process the image and sensor data to classify movements of the vehicle body. The classified movements of the vehicle body are assigned to at least one of a set of defined states. Output data from the determined state are generated for further use in an automated driving function and/or for a user interface.

18 Claims, 3 Drawing Sheets

(51) Int. Cl.
*B60W 60/00* (2020.01)
*G06N 3/08* (2023.01)
*G06V 10/82* (2022.01)
*H04W 4/40* (2018.01)

(52) U.S. Cl.
CPC .............. *G06V 10/82* (2022.01); *H04W 4/40* (2018.02); *B60W 2050/143* (2013.01); *B60W 2050/146* (2013.01); *B60W 2556/45* (2020.02); *G06V 2201/08* (2022.01)

(58) Field of Classification Search
CPC .............. B60W 50/14; B60W 60/001; B60W 2050/143; B60W 2050/146; B60W 2556/45; B60W 40/02; B60W 10/22; B60W 2050/0005; B60W 2420/403; B60W 2420/408; B60W 2420/54; H04W 4/40; H04W 4/029; H04W 4/38
See application file for complete search history.

(56) References Cited

U.S. PATENT DOCUMENTS

| | | | | |
|---|---|---|---|---|
| 10,981,564 | B2* | 4/2021 | Herman | G06N 3/08 |
| 11,034,346 | B2* | 6/2021 | Shalev-Shwartz | G05D 1/0253 |
| 11,046,312 | B2* | 6/2021 | Terayama | B60W 30/165 |
| 11,400,941 | B2 | 8/2022 | Ishikawa et al. | |
| 2018/0144636 | A1* | 5/2018 | Becker | B60W 30/0956 |
| 2020/0139975 | A1 | 5/2020 | Ishikawa et al. | |
| 2020/0249674 | A1* | 8/2020 | Dally | G05D 1/0221 |
| 2020/0282979 | A1* | 9/2020 | Kim | B60W 30/085 |
| 2020/0409374 | A1* | 12/2020 | Dong | G06V 10/758 |
| 2021/0049908 | A1* | 2/2021 | Pipe | G08G 1/0112 |
| 2021/0201676 | A1* | 7/2021 | Tariq | B60W 30/18163 |
| 2021/0232855 | A1* | 7/2021 | Yamamoto | G06N 3/084 |
| 2021/0309214 | A1* | 10/2021 | Hashimoto | B60W 30/08 |
| 2022/0005210 | A1* | 1/2022 | Raveendran | G06V 10/00 |

FOREIGN PATENT DOCUMENTS

| | | | | |
|---|---|---|---|---|
| CN | 108182428 A | * | 6/2018 | ......... G06K 9/00335 |
| CN | 109094566 A | * | 12/2018 | ......... B60G 17/0165 |
| DE | 102011007608 | | 10/2012 | |
| DE | 102016012230 A1 | * | 4/2018 | ......... B60G 17/0165 |
| DE | 102017201838 | | 8/2018 | |
| DE | 102019202634 B3 | * | 7/2020 | |
| DE | 102019204196 | | 10/2020 | |
| JP | 2003228800 | | 8/2003 | |
| JP | 2010160802 A | * | 7/2010 | ......... G06K 9/00335 |
| JP | 2019008709 | | 1/2019 | |

OTHER PUBLICATIONS

Barnwal, "Vehicle Behavior Analysis for Uneven Road Surface Detection," 2015 IEEE 18th International Conference on Intelligent Transportation Systems, Gran Canaria, Spain, 2015, pp. 1719-1722, doi: 10.1109/ITSC.2015.279. (Year: 2015).*

Nguyen et al., "Response-based methods to measure road surface irregularity: a state-of-the-art review," European Transportation Research Review, vol. 11, 43 (2019). https://doi.org/10.1186/s12544-019-0380-6 (Year: 2019).*

German Search Report dated Apr. 29, 2021.

* cited by examiner

METHOD, SYSTEM AND COMPUTER PROGRAM PRODUCT FOR DETECTING MOVEMENTS OF THE VEHICLE BODY IN THE CASE OF A MOTOR VEHICLE

CROSS REFERENCE TO RELATED APPLICATION

This application claims priority under 35 USC 119 to German Patent Appl. No. 10 2020 130 886.8 filed on Nov. 23, 2020, the entire disclosure of which is incorporated herein by reference.

BACKGROUND

Field of the Invention

The invention relates to a method, a system and a computer program product for detecting movements of the vehicle body of a motor vehicle.

Related Art

If a motor vehicle is controlled by a person, the driver of the vehicle observes very closely and intuitively whether there are any possible sources of danger on the route. In particular, vehicles traveling in front are observed closely to obtain different information, for example the speed of the vehicle traveling in front or whether an overtaking maneuver is planned. The driver also may observe whether the vehicle body of the vehicle is moving in a straight line or whether fluctuating lateral movements or up and down movements occur, such as those caused by bumps or obstacles on the road. A human driver intuitively carries out these observations while driving and is often entirely aware of how he processes the information, assigns it to a possible dangerous situation and accordingly controls the vehicle.

Some vehicles can drive in a partially autonomous or autonomous manner, and these vehicles may use camera systems and sensors to obtain information relating to the environment of the vehicle. The development of highly automated driving is therefore associated with an increase in the requirements imposed on vehicle sensor systems for recording suitable sensor data such as image data. In addition, the recorded sensor data must be interpreted carefully to obtain the correct conclusions with regard to a possible dangerous situation.

U.S. Pat. No. 11,046,312 describes a driving assistance device having a guide route specification unit, a driving environment information determination unit, a target route specification unit, a control unit for maintaining the vehicle distance, a calculation unit for an extent of lateral movement, an obstacle evasion process detection unit and a following controller to follow a vehicle traveling in front. The calculation unit for an extent of lateral movement calculates an extent of lateral movement of the vehicle traveling in front. The obstacle evasion process detection unit detects an obstacle evasion process of the vehicle traveling in front.

An object of this invention is to provide a reliable and efficient method, system and computer program product for detecting movements of the vehicle body of a motor vehicle.

SUMMARY

A first aspect of the invention relates to a method of using a data analysis device for detecting movements of the body of a motor vehicle. The method comprises:

recording image and sensor data by means of a camera and sensor device of a second motor vehicle, wherein the image and sensor data represent the environment of the second motor vehicle containing at least the first motor vehicle;

forwarding the image and sensor data to the data analysis device, where the data analysis device comprises a detection system that uses algorithms from the field of artificial intelligence (AI) and machine image analysis for detecting movements of the vehicle body of the first motor vehicle;

processing the image and sensor data in the data analysis device by means of the detection system to classify possible movements of the vehicle body;

assigning the classified movements of the vehicle body to at least one state $S_j$ from a set of defined states $S_1$, $S_2$, ..., $S_n$; and generating output data from the determined state $S_j$ for further use in an automated driving function and/or for a user interface.

The method may include processing image and sensor data in real time and outputting data to be generated in real time.

In one embodiment, the detection system comprises an analysis module and a classification module.

The detection system advantageously uses deep learning with a neural network.

In particular, the neural network may be in the form of a convolutional neural network.

One development provides for the classification module to contain features $M_1$, $M_2$, ..., $M_n$ of movements of a vehicle body of a vehicle that were determined or predefined in a training phase of the classification module.

The image and sensor data may be transmitted to the data analysis device by means of a mobile radio connection, and 5G radio modules may be used.

One embodiment provides for the image and sensor device to comprise an action camera and/or acoustic sensors and/or a LiDAR system and/or an ultrasonic system and/or a radar system.

A second aspect of the invention relates to a system for detecting movements of the body of a motor vehicle. The system comprises an image and sensor device of a second motor vehicle for recording image and sensor data, and a data analysis device. The image and sensor data represent the environment of the second motor vehicle containing at least the first motor vehicle. The data analysis device comprises a detection system for detecting movements of the vehicle body the first motor vehicle. The detection system uses algorithms from the field of artificial intelligence (AI) and machine image analysis. The data analysis device is designed to process the image and sensor data by means of the detection system, to classify possible movements of the vehicle body, to assign at least one state $S_j$ from a set of defined states $S_1$, $S_2$, ..., $S_n$ to the classified movements of the vehicle body and to generate output data from the determined state $S_j$ for further use in an automated driving function and/or for a user interface.

The image and sensor data to be processed and for output data to be generated in real time.

In one embodiment, the detection system comprises an analysis module and a classification module.

The detection system advantageously uses deep learning with a neural network, such as a convolutional neural network.

The classification module may contain features $M_1$, $M_2, \ldots, M_n$ of movements of the vehicle body of a motor vehicle that were determined or predefined in a training phase of the classification module.

The image and sensor data may be transmitted to the data analysis device by a mobile radio connection that uses a 5G radio module in some embodiments.

The image and sensor device may comprise an action camera and/or acoustic sensors and/or a LiDAR system and/or an ultrasonic system and/or a radar system.

The invention also relates to a computer program product comprising an executable program code that is configured such that, during its execution, the computer program product carries out the method described herein.

The invention is explained in more detail below on the basis of an exemplary embodiment illustrated in the drawing.

DETAILED DESCRIPTION

Figure 1:
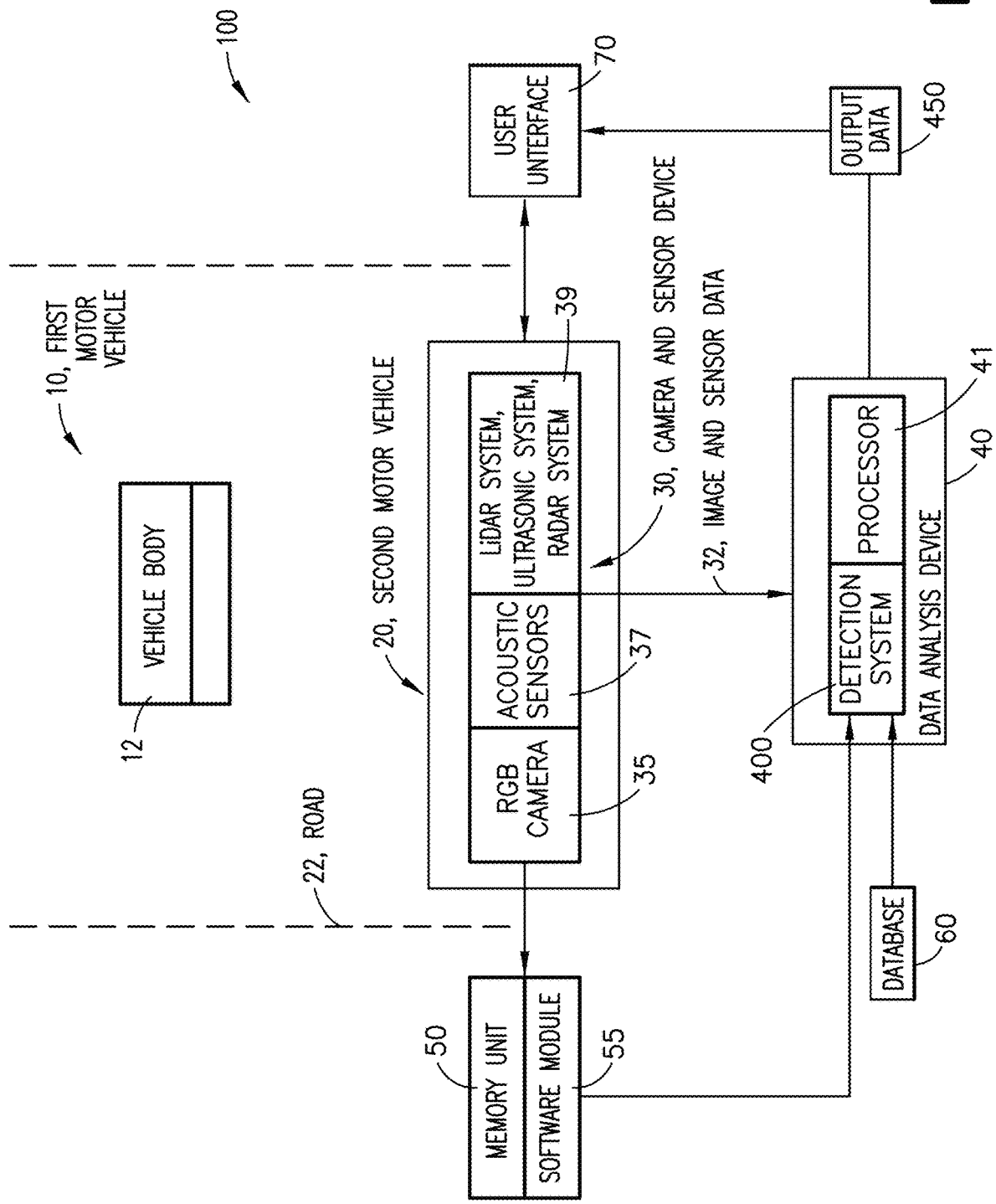
FIG. 1 is a schematic illustration of a system according to the invention for detecting movements of the vehicle body of a motor vehicle.

FIG. 1 illustrates the system 100 according to the invention. A first motor vehicle 10 traveling in front has a vehicle body 12 and is observed by a second motor vehicle 20 following the first motor vehicle 10. The second motor vehicle 20 has a camera and sensor device 30 for recording image and sensor data 32 in a recording area. The camera and sensor device 30 records the environment of the second motor vehicle 20 in the recording area which is oriented to a road 22 that is in front of the second motor vehicle 20 and on which the first motor vehicle 10 is situated. The vehicle body 12 of the first motor vehicle 10 may move in a straight line or may fluctuate laterally or may move up and down, to indicate bumps or obstacles on the road. Furthermore, braking and acceleration processes may take place so that the vehicle body 12 moves at a changed speed. The camera and sensor device 30 forwards the recorded image and sensor data 32 to a data analysis device 40 for further processing.

The camera and sensor device 30 comprises an RGB camera 35 in the visible range with the primary colors of blue, green and red. However, a UV camera in the ultraviolet range and/or an IR camera in the infrared range may also be additionally provided. Cameras that differ in terms of their recording spectrum may therefore image different light conditions in the recording area.

The recording frequency of the camera of the camera and sensor device 30 is designed for fast speeds of the vehicle 10 traveling in front and can record image data 32 at a high image recording frequency. Furthermore, the camera and sensor device 30 may be equipped with acoustic sensors 37 for capturing acoustic signals, such as a microphone. This makes it possible to record rolling noises of the tires or engine noises. Furthermore, the image and sensor device 30 may have a LiDAR system, an ultrasonic system and/or a radar system 39 to measure, for example, the distance between the first motor vehicle 10 traveling in front and the following second motor vehicle 20 or the speed of the first motor vehicle 10 traveling in front. In particular, this makes it possible to capture information in three-dimensional space.

Provision may also be made for the camera and sensor device 30 to start the image recording process automatically when there is a significant change in size in the recording area of the camera and sensor device 30, for example, if a vehicle 10 appears in the recording area of the camera and sensor device 30. This enables a selective data capture process, and only relevant image and sensor data 32 are processed by the data analysis device 40. This makes it possible to use computing capacities more efficiently.

In addition, a GPS connection (Global Positioning System) advantageously is provided to determine the and to assign the geographical location to the recorded image and sensor data 32.

The camera 35 may be a weatherproof action camera arranged in the outer region of the vehicle 20. Action cameras have wide-angle fisheye lenses, thus making it possible to achieve a visible radius of approximately 180°. Action cameras can usually record videos in full HD (1920× 1080 pixels), but it is also possible to use action cameras in ultra HD or 4K (at least 3840×2160 pixels), thus resulting in a considerable increase in the image quality. The image recording frequency is usually 60 images per second in 4K and up to 240 images per second in full HD. In addition, an integrated image stabilizer may be provided. Action cameras often also are equipped with an integrated microphone. Differential signal processing methods can be used to hide background noises in a specific manner.

The image and sensor data 32 recorded by the camera and sensor device 30 preferably are forwarded to the data analysis device 40 via a wireless mobile radio connection.

The data analysis device 40 preferably has a processor 41 that processes the image and sensor data 32 by means of a detection system 400. The processor 41 or a further processor also is designed to control the camera and image recording device 30. However, it is also conceivable for the image and sensor data 32 to be stored initially in a memory unit 50 or a software module 55 and to be processed by the data analysis device 40 at a later time. The data analysis device 40 and the processor 41 may be integrated in the vehicle 20 or may be in the form of a cloud-based solution with a cloud computing infrastructure that is connected to the vehicle 20 via a mobile radio connection.

The data analysis device 40 can access one or more further databases 60. The database 60 may store, for example, classification parameters for analyzing the recorded image and sensor data 32 or further images and/or characteristic variables. Furthermore, target variables and target values that define a safety standard may be stored in the database 60. A user interface 70 for inputting further data and for displaying the calculation results created by the data analysis device 40 may also be provided. In particular, the user interface 70 may be a display with a touchscreen.

In connection with the invention, a "processor" can be understood as meaning, for example, a machine or an electronic circuit or a powerful computer. A processor may be a main processor (Central Processing Unit, CPU), a microprocessor or a microcontroller, for example an application-specific integrated circuit or a digital signal processor, possibly in combination with a memory unit for storing program instructions, etc. A processor may also be understood as meaning a virtualized processor, a virtual machine or a soft CPU. It may also be a programmable processor equipped with configuration steps for carrying out the method disclosed herein or may be configured with configuration steps in such a manner that the programmable processor implements the features of the disclosed method, of the component, of the modules or of other aspects and/or partial aspects of the invention. Highly parallel computing units and powerful graphics modules also be provided.

In connection with this disclosure, a "memory unit" or "memory module" and the like may be understood as meaning, for example, a volatile memory in the form of a random access memory (RAM) or a permanent memory such as a hard disk or a data storage medium or, for example, an interchangeable memory module. However, the memory module may also be a cloud-based memory solution.

In connection with this disclosure, a "module" can be understood as meaning, for example, a processor and/or a memory unit for storing program instructions. For example, the processor may specifically be configured to execute the program instructions such that the processor performs functions to implement or execute the method according to this disclosure or a step of the method.

In connection with the invention, recorded image and sensor data 32 should be understood as meaning both the raw data and already preprocessed data from the recording results of the image and sensor device 30.

In particular, the image and sensor device 30 may have mobile radio modules of the 5G standard. 5G is the fifth generation mobile radio standard and, in comparison with the 4G mobile radio standard, is distinguished by higher data rates of up to 10 Gbit/sec, the use of higher frequency ranges, for example 2100, 2600 or 3600 megahertz, an increased frequency capacity and therefore an increased data throughput and real-time data transmission, since up to one million devices per square kilometer can be addressed at the same time. The latencies are a few milliseconds to less than 1 ms, with the result that real-time transmissions of data and calculation results are possible. The image and sensor data 32 recorded by the image and sensor device 30 are transmitted in real time to a cloud computing platform where the corresponding analysis and calculation are carried out. The analysis and calculation results are transmitted back to the vehicle 20 in real time and can therefore be quickly integrated in handling instructions for the driver or in automated driving functions. This speed when transmitting the data is necessary if cloud-based solutions are intended to be used for processing the image and sensor data 32. Cloud-based solutions provide the advantage of high and therefore fast computing powers.

If the data analysis device 40 is integrated in the vehicle, AI hardware acceleration, such as the Coral Dev Board, is used for the processor 41 to enable real-time processing. This is a microcomputer with a tensor processing unit (TPU), as a result of which a pre-trained software application can evaluate up to 70 images per second.

Figure 2:
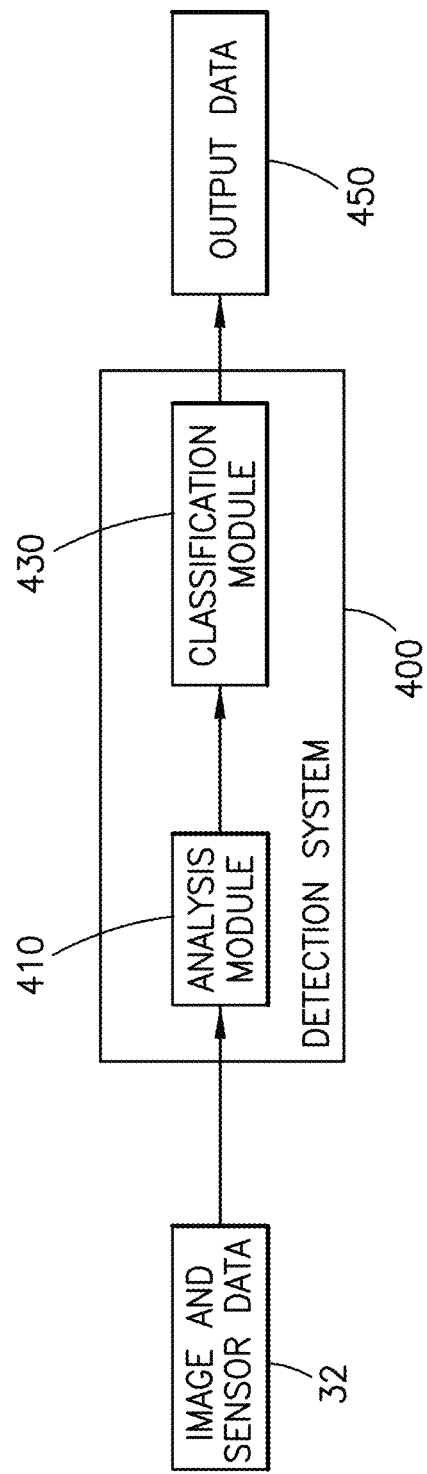
FIG. 2 schematically illustrates a detection system according to an embodiment of the invention.

FIG. 2 shows the detection system 400 of the invention which in the form of a software application for analyzing and processing the captured and/or stored image and sensor data 32 to detect a change in the movements of the vehicle body 12 in the case of the vehicle 10. In particular, the detection system 400 processes the captured image and sensor data 32 by means of artificial intelligence and machine image analysis algorithms in order to select and classify said data. The detection system 400 advantageously uses algorithms from the field of machine learning, preferably deep learning with convolutional neural networks, for example, for analyzing the captured image and sensor data 32. In addition, the image and sensor data 32 from the various sensor sources such as optics, acoustics and distance measurement can be combined with one another in order to obtain a comprehensive picture of a driving situation.

A neural network comprises neurons arranged in layers and connected to one another differently. A neuron is able to receive information from the outside or from another neuron at its input, to assess the information in a particular manner and to forward the information to a further neuron in a changed form at the neuron output or to output it as a final result. Hidden neurons are arranged between the input neurons and output neurons. Depending on the network type, there may be a plurality of layers of hidden neurons. They ensure that the information is forwarded and processed. Output neurons finally provide a result and output it to the outside world. Arranging and linking the neurons produces different types of neural networks such as feed-forward networks, recurrent networks or convolutional neural networks. The networks can be trained by means of unsupervised or monitored learning.

The detection system 400 has an analysis module 410 in the form of a convolutional neural network (CNN). The image and sensor data 32 from the camera and sensor device 30 are used as input data of the analysis module 410. Data from the database 60 also can be used. The data formats of the input data are preferably in the form of tensors. In addition, different image formats can be used.

The convolutional neural network is a special form of an artificial neural network. It has a plurality of convolutional layers and is very highly suited to machine learning and applications with artificial intelligence (AI) in the field of image and voice recognition. The method of operation of a convolutional neural network is modeled to a certain extent on biological processes and the structure is comparable to the visual cortex of the brain. A convolutional neural network is usually trained in a monitored manner. Conventional neural networks comprise fully meshed or partially meshed neurons in a plurality of levels. However, these structures reach their limits when processing images since a number of inputs corresponding to the number of pixels would have to be available. The convolutional neural network is composed of different layers and, in terms of the basic principle, is a partially locally meshed neural feed-forward network. The individual layers of the CNN are the convolutional layer, the pooling layer and the fully meshed layer. The pooling layer follows the convolutional layer and may be present multiple times in succession in this combination. Since the pooling layer and the convolutional layer are locally meshed sub-networks, the number of connections in these layers remains limited even in the case of large input volumes and remains in a manageable framework. A fully meshed layer forms the termination. The convolutional layer is the actual convolutional level and is able to detect and extract individual features in the input data. During image processing, these may be features such as lines, edges or particular shapes. The input data are processed in the form of tensors, such as a matrix or vectors. The pooling layer, also called subsampling layer, compresses and reduces the resolution of the detected features by appropriate filter functions. In particular, a max pool function is used for this purpose and calculates the maximum value for a (usually) non-overlapping portion of the data. However, mean value pooling can also be used in addition to the maximum pooling. The pooling rejects superfluous information and reduces the volume of data. The performance during machine learning is not reduced as a result. The calculation speed is increased as a result of the reduced volume of data.

The fully linked layer forms the termination of the convolutional neural network. It is the result of the repeated sequence of the convolutional and pooling layers. All features and elements of the upstream layers are linked to each output feature. The fully connected neurons may be arranged in a plurality of levels. The number of neurons is dependent on the input data which are intended to be processed by the convolutional neural network.

Therefore, in comparison with conventional non-convolutional neural networks, the convolutional neural network (CNN) provides numerous advantages. It is suitable for machine learning and artificial intelligence applications with large volumes of input data, such as in image recognition. The network operates reliably and is insensitive to distortions or other optical changes. The CNN can process images recorded in different light conditions and from different perspectives. It nevertheless detects the typical features of an image. Since the CNN is divided into a plurality of local, partially meshed layers, it has a considerably lower memory space requirement than fully meshed neural networks. The convolutional layers drastically reduce the memory requirements. It likewise greatly shortens the training time of the convolutional neural network. CNNs can be trained very efficiently using modern graphics processors. The CNN detects and extracts features of the input images with the aid of filters. The CNN first of all detects simple structures such as lines, color features or edges in the first layers. In the further layers, the convolutional neural network learns combinations of these structures such as simple shapes or curves. More complex structures can be identified with each level. The data are resampled and filtered again and again in the levels.

The image and sensor data 32 therefore preferably are processed by a convolutional neural network in the analysis module 410. A classification module 430 that contains features $M_1, M_2, \ldots, M_n$ of movements of the vehicle body 12 of a vehicle also is provided. In addition, certain states $S_1, S_2, \ldots, S_n$ of the environment of the vehicle 10 may be assigned to these features $M_1, M_2, \ldots, M_n$. Certain fast upward and downward movements of the vehicle body 12 can therefore indicate possible bumps and/or unevenness and damage of the surface of the road 22. Lateral movements of the vehicle body 12 may be an indication of an obstacle on the road 22 and is evaded by the vehicle 10 traveling in front. An excessively short distance to the vehicle 10 traveling in front may be detected and may indicate a critical driving situation. Safety levels such as low to high may in turn be assigned to the states $S_1, S_2, \ldots, S_n$. These features $M_1, M_2, \ldots, M_n$ and/or states $S_1, S_2, \ldots, S_n$ of the environment of the vehicle 10 preferably were determined in a training phase by the CNN or were predefined and transmitted to the classification module 430.

The image and sensor data 32 processed in this manner are integrated, as output data 450, in an automated driving function and/or are transmitted to the user interface 70. They may be output there as recommended actions or warnings to the driver of the vehicle 20. For example, a warning tone or an optical indication, which is intended to prompt the driver to adopt a changed driving behavior, may be output via the user interface 70. In the case of an automated driving function, the driving speed may be automatically reduced, for example. Furthermore, provision may be made for the damping unit for the front axle and/or rear axle of the vehicle 20 to be automatically adapted, with the result that the damping is set to be softer, for example, with the result that the vehicle 20 can drive over the bumps or road damage more safely and in a manner which is more comfortable for the occupants.

Figure 3:
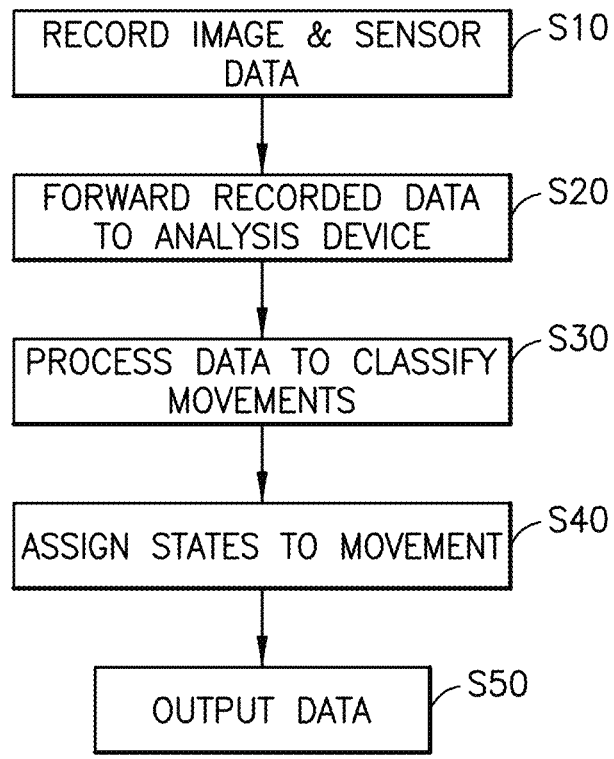
FIG. 3 is a flowchart illustrating the steps of a method of the invention.

A method for detecting movements of the vehicle body of a motor vehicle traveling in front according to the present invention therefore comprises the following steps, as illustrated schematically in the flow chart of FIG. 3.

In a step S10, image and sensor data 32 are recorded by a camera and sensor device 30 of a second motor vehicle 20. The image and sensor data 32 represent the environment of the second motor vehicle 20 containing at least the first motor vehicle 10.

In a step S20, the image and sensor data 32 are forwarded to a data analysis device 40, wherein the data analysis device 40 comprises a detection system 400 for detecting movements of the vehicle body 12 of the first motor vehicle 10. The detection system uses algorithms from the field of artificial intelligence (AI) and machine image analysis.

In a step S30, the image and sensor data 32 are processed in the data analysis device 30 by the detection system 200 to classify possible movements of the vehicle body 12.

In a step S40, at least one state $S_j$ from a set of defined states $S_1, S_2, \ldots, S_n$ is assigned to the classified movements.

In a step S50, output data 450 are generated from the determined state $S_j$ for further use in an automated driving function and/or for a user interface 70.

Therefore, images from the environment of a second vehicle 20 can be analyzed in real time with respect to the movements of the vehicle body 12 in the case of a vehicle 10 traveling in front by means of a detection system 400 which uses algorithms from the field of artificial intelligence (AI) and machine image analysis. The present invention makes it possible to automatically capture movements of the vehicle body 12 of the vehicle 10. The road situation, such as the occurrence of bumps or damage to the road surface, can be derived from the classified movements. The result of the analysis is output, for example, as an optical and/or acoustic warning signal on a user interface 70 of the second vehicle 20 if the movements of the vehicle body 12 of the vehicle 10 traveling in front indicate a critical driving situation for the second vehicle 20.

In addition, adaptations to the driving behavior or the setting of vehicle components, such as the degree of damping for the front and/or rear axle, can be made by automatic or semi-automatic driving functions. If an excessively short distance to the vehicle 20 traveling in front is detected, the driving speed of the vehicle 10 can be automatically reduced or a braking process can be initiated. Since the data are transmitted and evaluated in real time, a fast response in the region of milliseconds is possible. This is highly important, in particular, in the case of a high driving speed of the vehicle 10 since only in this manner is it possible to ensure that automatic driving functions can react appropriately to a current driving situation. The present invention therefore makes it possible to further increase safety during driving.

Figure 4:
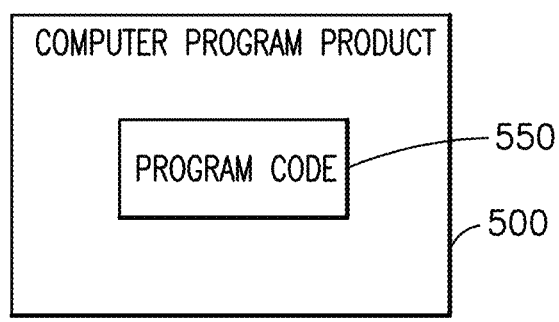
FIG. 4 schematically illustrates a computer program product according to an embodiment of the invention.

The invention also relates to a computer program product 500 comprising an executable program code 550 that is shown schematically in FIG. 4 and that is configured such that, during its execution, the computer program product 500 carries out the method described above with reference to FIG. 3.

REFERENCE SIGNS

10 First motor vehicle
12 Vehicle body
20 Second motor vehicle

22 Road
30 Camera and sensor device
32 Image and sensor data
35 RGB camera
37 Acoustic sensors
39 LiDAR system, ultrasonic system, radar system
40 Data analysis device
41 Processor
50 Memory unit
55 Software module
60 Database
70 User interface
100 System
400 Detection system
410 Analysis module
430 Classification module
450 Output data
500 Computer program product
550 Program code

What is claimed is:

1. A method for detecting movements of a vehicle body of a first motor vehicle, the method comprising:
   recording image and sensor data by means of an image and sensor device of a second motor vehicle, the image and sensor data representing a part of an environment of the second motor vehicle that contains at least the first motor vehicle, the image and sensor device recording both lateral and vertical movements of the vehicle body of the first motor vehicle and acoustic signals of the first motor vehicle;
   forwarding the image and sensor data to a data analysis device that comprises a detection system for detecting the lateral and vertical movements of the vehicle body of the first motor vehicle and the acoustic signals of the first motor vehicle, the detection system using artificial intelligence algorithms and machine image analysis;
   processing the image and sensor data in the detection system of the data analysis device to classify lateral and vertical movements of the vehicle body of the first motor vehicle and the acoustic signals of the first motor vehicle;
   assigning the classified movements and the acoustic signals of the vehicle body to at least one state from a set of defined states; and
   generating output data from the determined state and using the output data to carry out an automated driving function of the second motor vehicle and/or for output at a user interface of the second motor vehicle.

2. The method of claim 1, wherein the image and sensor data are processed and output data are generated in real time.

3. The method of claim 1, wherein the detection system comprises an analysis module and a classification module.

4. The method of claim 3, wherein the detection system uses deep learning with a neural network.

5. The method of claim 4, wherein the neural network is a convolutional neural network.

6. The method of claim 3, wherein the classification module contains features of movements of the vehicle body of a vehicle that were determined or predefined in a training phase of the classification module.

7. The method of claim 5, wherein the image and sensor data are transmitted to the data analysis device by a mobile radio connection.

8. The method of claim 1, wherein the image and sensor device comprises at least one of an action camera, acoustic sensors, a LiDAR system, an ultrasonic system and a radar system.

9. A system for detecting movements of vehicle body of a first motor vehicle, comprising
   an image and sensor device of a second motor vehicle, the image and sensor device of the second moto vehicle being configured to record image and sensor data that represent a part of an environment of the second motor vehicle that contains at least the first motor vehicle and includes lateral and vertical movements of the first motor vehicle and noise generated by the first motor vehicle; and
   a data analysis device that includes a detection system that uses artificial intelligence algorithms and machine image analysis for detecting lateral and vertical movements of the vehicle body of the first motor vehicle and noise generated by the first motor vehicle, and the data analysis device being configured to process the image and sensor data, to classify the lateral and vertical movements of the vehicle body of the first motor vehicle and the noise generated by the first motor vehicle, to assign at least one state from a set of defined states to the classified lateral and vertical movements of the vehicle body and the noise generated by the first motor vehicle and to generate output data from the determined state for further use in an automated driving function and/or for a user interface.

10. The system of claim 9, wherein the image and sensor data are processed and output data are generated in real time.

11. The system of claim 9, wherein the detection system comprises an analysis module and a classification module.

12. The system of claim 11, wherein the detection system uses deep learning with a neural network.

13. The system of claim 11, wherein the classification module contains features of movements of the vehicle body of the first vehicle that were determined or predefined in a training phase of the classification module.

14. The system of claim 9, wherein the image and sensor data are transmitted to the data analysis device by a mobile radio connection.

15. The system of claim 9, wherein the image and sensor device comprises at least one of an action camera, acoustic sensors, a LiDAR system, an ultrasonic system and a radar system.

16. A non-transitory computer-readable medium encoded with a computer program comprising an executable program code that is configured such that when the non-transitory computer-readable medium is loaded on a computer, the non-transitory computer-readable medium carries out the method of claim 1.

17. The method of claim 1, wherein using the output data to carry out an automated driving function of the second motor vehicle comprises damping at least one of a front and rear axle of the second motor vehicle in response to vertical movements of the first motor vehicle indicative of a bump or road damage in a road surface.

18. The method of claim 1, wherein using the output data to carry out an automated driving function of the second motor vehicle or to generate an output at a user interface of the second motor vehicle is carried out in response to specified changes in tire noise or engine noise emanating from the first motor vehicle.

* * * * *